(12) United States Patent
van den Berge et al.

(10) Patent No.: US 6,261,454 B1
(45) Date of Patent: Jul. 17, 2001

(54) DEVICE FOR TREATING, IN PARTICULAR WASHING, GLUTEN OR THE LIKE

(75) Inventors: Adriaan J. van den Berge, Kruiningen; Rumoldus C. H. M. Rasenberg, Halsteren; Jacobus de Rooij, Kapelle; Jacob Biemond, Wouw, all of (NL)

(73) Assignee: Cargill, B.V., Bergen op Zoom (NL)

( * ) Notice: Subject to any disclaimer, the term of this patent is extended or adjusted under 35 U.S.C. 154(b) by 0 days.

(21) Appl. No.: 09/142,007

(22) Filed: Aug. 28, 1998

Related U.S. Application Data

(63) Continuation of application No. PCT/NL97/00095, filed on Feb. 28, 1997.

(30) Foreign Application Priority Data

Feb. 28, 1996 (NL) ................................. 1002475
May 28, 1996 (NL) ................................. 1003212

(51) Int. Cl.[7] ................................... B01D 33/06
(52) U.S. Cl. .................... 210/326; 210/391; 210/394; 210/402; 210/403; 210/409; 209/270; 209/288
(58) Field of Search .................. 210/326, 380.3, 210/391, 402, 403, 409, 394; 209/262, 270, 288

(56) References Cited

U.S. PATENT DOCUMENTS

| | | | |
|---|---|---|---|
| 3,510,002 | * 5/1970 | Evans | 210/326 |
| 3,981,738 | * 9/1976 | Rao et al. | 209/262 |
| 5,265,447 | * 11/1993 | Bilodeau et al. | 210/402 |

* cited by examiner

Primary Examiner—David A. Reifsnyder
(74) Attorney, Agent, or Firm—Fitch, Even, Tabin & Flannery

(57) ABSTRACT

Device for washing gluten, provided with at least one drum screen rotatably supported on a corrosion-resistant shaft, and equipped with means for supplying and discharging washing water and also with means for supplying the material to be treated at the one drum end and removing the treated gluten at the other drum end, at least two sets of spoke-type elements which are made of corrosion-resistant material and which support the circumferential wall of the drum screen being provided on the drum shaft at points disposed at a distance from one another in the longitudinal direction, which sets are each mounted, when viewed in the circumferential direction, on a bush which is made up of at least two parts made of corrosion-resistant material and attached to one another by flanges and which is to be firmly clamped to the shaft, the shaft being made of steel which is not corrosion-resistant and which has a high modulus of elasticity, and lining sleeves made of corrosion-resistant material being provided around the shaft at points between the shaft ends and the bushes and also between the bushes.

5 Claims, 9 Drawing Sheets

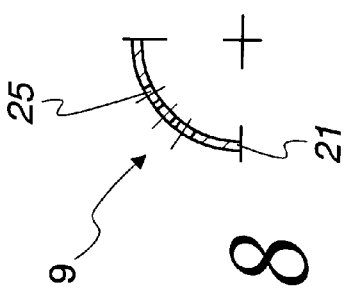
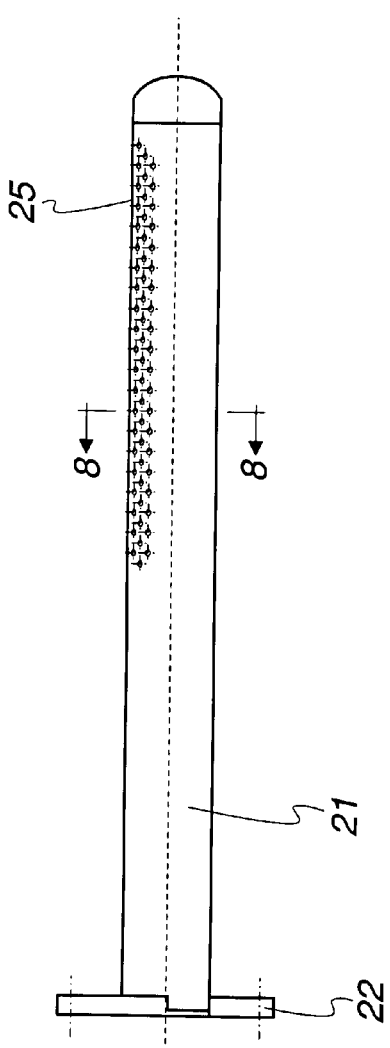
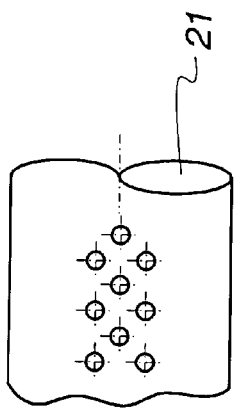

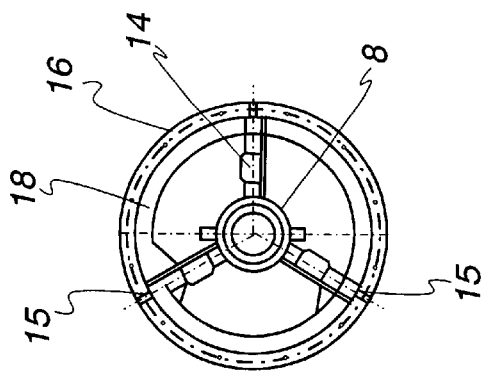
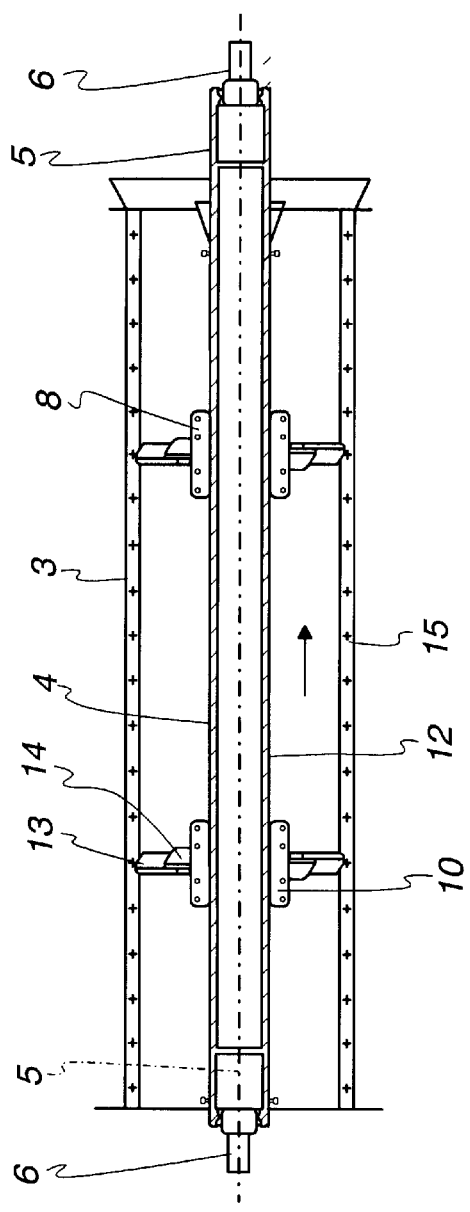

DEVICE FOR TREATING, IN PARTICULAR WASHING, GLUTEN OR THE LIKE

This is a continuation, of prior application Ser. No. PCT/NL97/00095, designating the United States and filed Feb. 28, 1997, which is hereby incorporated herein by reference in its entirety.

FIELD OF THE INVENTION

Device for treating, in particular for washing, gluten or the like, provided with at least one drum screen which is rotatably supported by a corrosion-resistant shaft, and is equipped with means for supplying and removing washing water, and also with means for supplying the material to be treated at one drum end and removing the treated material at the other drum end, spoke-type elements which are made of corrosion-resistant material and which support the circumferential wall of the drum screen being provided on the drum shaft.

BACKGROUND OF THE INVENTION

A device of this type is known in practice and is used, in particular, in the starch-producing industry. In the latter, wheat, which contains starch, bran and vital proteins (referred to as "gluten"), is split into said three main components. The gluten is used, inter alia, in bakeries to make bread less compact. After the coarse splitting of the wheat, the gluten is still "contaminated" with residual starch. In the washing device, the gluten contaminated with residues of starch is rinsed with water at high pressure, as a result of which the starch is removed from the gluten. This involves drum screens which rotate in continuous operation and of which the length may be 6 metres and more.

In view of the acid environment prevailing inside the drum, the shafts, which are generally hollow, of said drum screens have hitherto been made of corrosion-resistant stainless steel, while the spoke-type elements supporting the circumferential wall of the drum screens have at the same time simply been welded onto the hollow shaft.

The shaft, which rotates at a rotational speed of approximately 10–20 rev/min, is exposed during operation to heavy impact loads due to the heavy masses of material which move upwards along the one side of the drum and drop down from the circumferential wall of the drum screen on reaching the top.

Under the influence of said heavy loads, fracture frequently occurs in practice and indeed, at the position of the welded joints in particular.

Although the use of larger shaft diameters and greater wall thicknesses for the hollow shaft reduces the risk of fracture, it does not eliminate it and, in addition, means an appreciable cost factor.

A solution tested by the Applicant consisted in sliding onto the stainless-steel hollow shaft bushes to which the spoke-type elements were welded and which were secured by means of bolts passing transversely through the hollow shaft. Although this measure meant an improvement with respect to the solutions in which larger shaft diameters and greater wall thicknesses were used, it is nevertheless still not effective enough to prevent rupture of the shaft.

The object of the invention is therefore to provide a gluten washing device which is more safe in operation and requires less maintenance, and the object is, in particular, to provide a more effective and, in addition, cheap solution to the abovementioned problems, as a result of which rupture of the shaft during continuous operation is prevented or the risk of rupture is reduced to a minimum.

SUMMARY OF THE INVENTION

According to the invention, said object is achieved in that the spoke-type elements are mounted on at least one bush which is made up, when viewed in the circumferential direction, of at least two parts made of corrosion-resistant material and which is mounted on the shaft.

In a preferred embodiment, the bush is firmly clamped to the shaft.

In a further preferred embodiment, the shaft is made of steel having a high modulus of elasticity and lining sleeves made of corrosion-resistant material are provided around the shaft between the two shaft ends, which lining sleeves adjoin the bush ends and the shaft ends by means of their end rims in a leakproof manner.

The advantage of this preferred embodiment of the invention is that a steel tube having a high resistance to continuously varying loads can be used for the shaft, which steel tube does not need to be corrosion-resistant. A steel tube of this type can generally be obtained commercially with any desired length and with any desired wall thickness. This steel shaft is cheaper than the stainless-steel shafts used hitherto. Because operations have to be carried out only at the ends of the shaft in order to be able to support the shaft rotatably, preferential rupture regions are, in addition, no longer created in the tube.

In a further preferred embodiment, at least two bushes are clamped to the shaft, which bushes each support a set of spoke-type elements. In this case, the end rims, situated near the shaft ends, of the lining sleeves are joined by means of an inwardly directed flange to the head ends of the shaft, while the end rims, situated near the bushes, of the lining sleeves adjoin sealing rings received in inner circumferential recesses of the bushes and resting on the shaft.

According to a further characteristic of the invention, the circumferential wall of the drum screen comprises at least two sector-type wall parts in the circumferential direction. Preferably, there are three sector-type wall parts present, which adjoin one another by means of their longitudinal edges at the position of longitudinal bars which are supported by corresponding spoke-type elements of the sets. In this design, the spoke-type elements may comprise, when viewed in the radial direction, a plurality of parts which are joined detachably to one another. This embodiment of the gluten washing device having a plurality of sector-type wall parts and having spoke-type elements comprising a plurality of parts detachably joined to one another has the advantage that the device for treating gluten can easily be disassembled and reassembled so that the continuous operation needs to be shut down only for a short time during maintenance operations.

According to a further aspect of the invention, the device comprises two drum screens which are arranged substantially parallel to one another and which are received in a housing completely enclosing the drum screens.

The capacity of the device is appreciably increased as a result of this design, while, in addition, a compact structure of the device is obtained and modern requirements relating to working conditions and environment are met.

Further measures according to the invention which increase the capacity and the efficiency of the gluten washing device and limit or facilitate the maintenance thereof are defined in claims 9–12.

The invention will be explained in greater detail below by reference to an exemplary embodiment, shown diagrammatically in the accompanying drawing, of the device according to the invention.

BRIEF DESCRIPTION OF THE DRAWINGS

FIG. 7 shows a view of a supply line.

FIG. 8 shows, on a larger scale, a part of a section along the line VIII—VIII in FIG. 7.

FIG. 9 shows a view of FIG. 8, as seen in the direction of arrow IX in FIG. 8.

FIG. 10 shows a longitudinal-section view of the drum screen received in the device according to the invention.

FIG. 11 shows a cross section of the drum screen according to FIG. 10 at the position of the spoke-type elements supporting the circumferential wall of the drum screen.

DETAILED DESCRIPTION OF THE PREFERRED EMBODIMENTS

Figure 1:
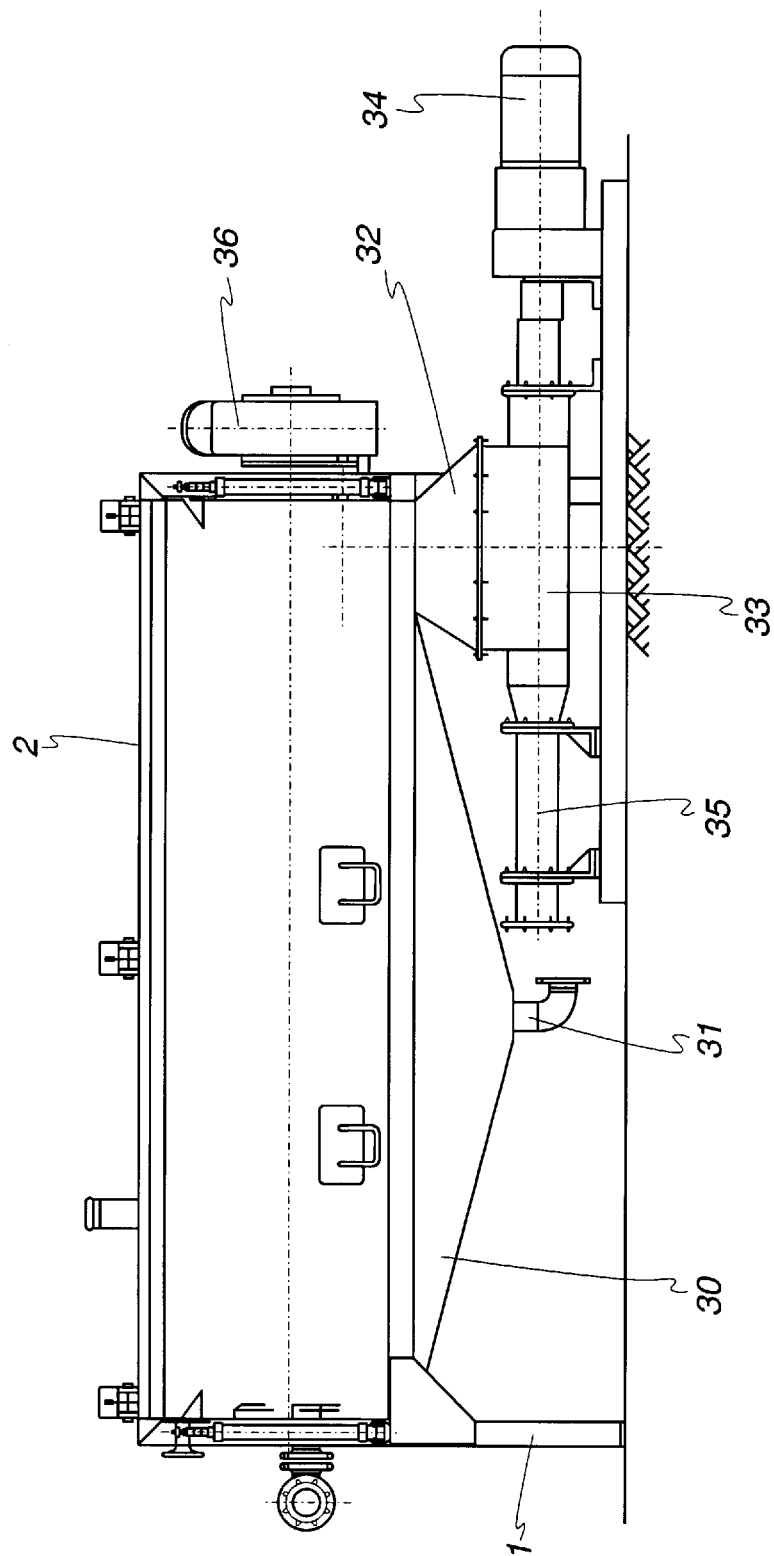
FIG. 1 shows diagrammatically a side view of the device according to the invention.

The device shown in the figures for washing gluten comprises a frame 1 which supports a plate-type housing 2. Disposed in the housing 2 are two drum screens 3 which are arranged parallel to one another and are rotatable about horizontal axes 4 of rotation.

As is shown in greater detail in FIGS. 10–13, a drum screen 3 comprises a central tubular shaft 4, into the ends of which shaft stubs 5 have been introduced, which shaft stubs 5 have shaft journals 6 which project out of the shaft 4 and which are mounted in bearings 7 attached to the frame 1.

At points disposed at a distance from one another, bushes 8 are provided around the shaft which are each made up of two shell-type parts 9 which are attached to one another by bolts inserted through flanges 10 attached to the shell-type parts 9 and are firmly clamped on the shaft 4. A seal 39 is provided between the flanges 10 over the entire length thereof.

Disposed in inner circumferential recesses of the bushes 8 are sealing rings 11. The seals 39 disposed between the flanges 10 adjoin said sealing rings 11. In this connection, two elongated seals 39 and two sealing rings 1 for each bush 8 may be designed as an integrated part. Adjoining said sealing rings 11 in the longitudinal direction are, furthermore, lining sleeves 12 which are joined by means of screws to the head ends of the shaft 4 at their end rims adjacent to the shaft ends by an inwardly directed flange 40 (see FIG. 12). The lining sleeves 12 are made of corrosion-resistant material, while the shaft 4 is made of steel having a high resistance to continuously varying loads, which steel does not have to be corrosion-resistant.

Two spoke-type elements 13 are attached to one of the shell-type parts 9 of each bush 8 and a single spoke-type element 13 is attached to the other shell-type part 9 in such a way that said spoke-type elements are arranged so as to be staggered at an angular distance of 120° with respect to one another around the centre line of the shaft 4. At the same time, the spoke-type elements enclose an angle having a plane extending perpendicularly to the centre line of the shaft 4.

Figure 4:
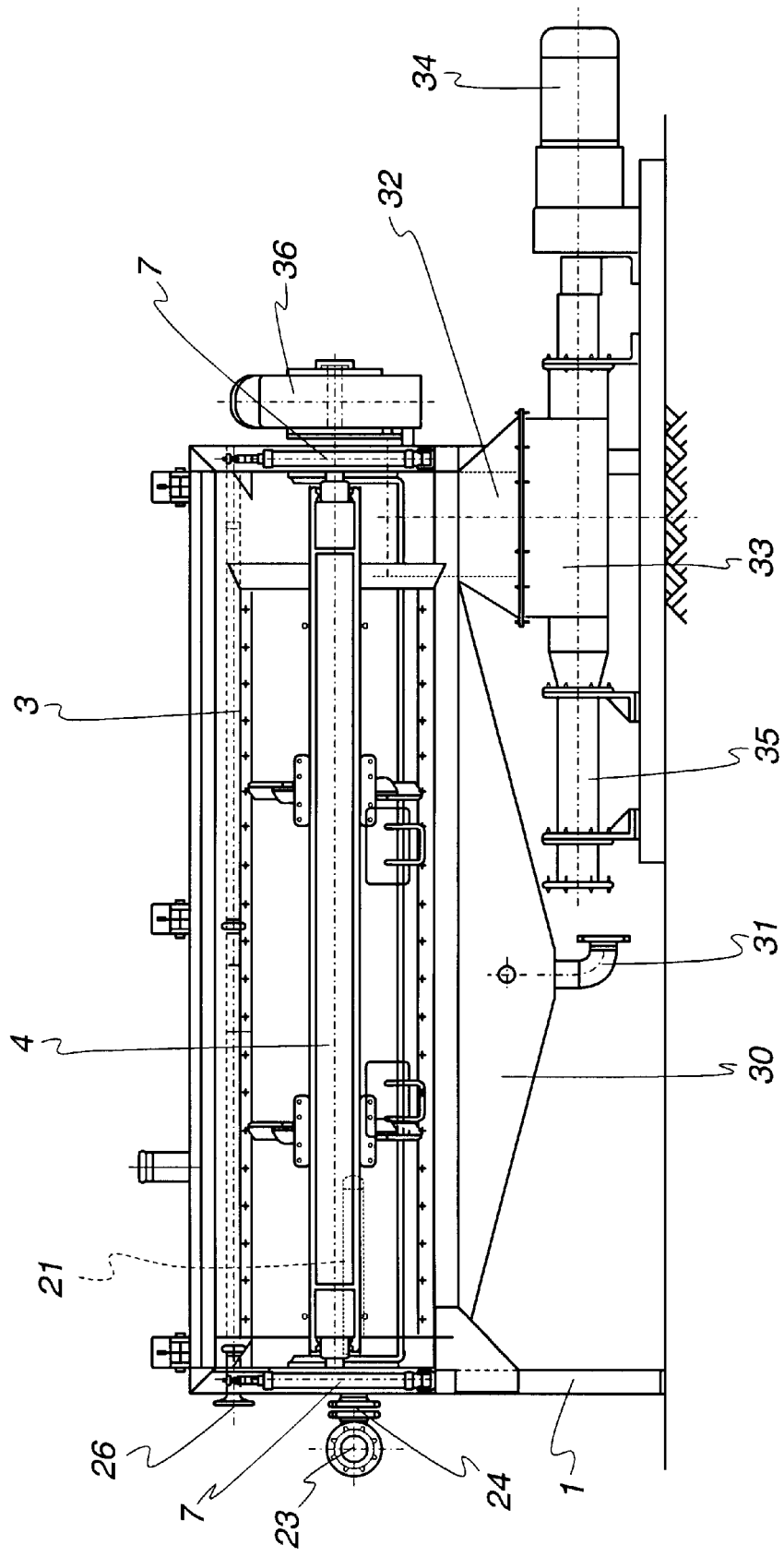
FIG. 4 shows the device according to FIG. 1, partly in a longitudinal-section view and partly in a side view.

The spoke-type elements 13 each comprise, when viewed in the radial direction, two parts which are detachably joined to one another by a joining part 14 (FIG. 4). Attached to the free ends of the spoke-type elements 13 are three longitudinal bars 15 which extend in the longitudinal direction of the drum 3 and which are staggered at an angle of 120° with respect to one another around the centre line of the shaft 4. Provided between the longitudinal bars 15 are detachable, curved bars 16 which extend concentrically around the shaft 4 and which support sector-type parts of a drum screen wall 17 forming the outer circumference of the drum screen 3 (see FIG. 5). Furthermore, the longitudinal bars 15 support a helical transport element 18 which is provided in the interior of the drum screen 3 and extends over its length, with the aid of which transport element the material to be treated is gradually displaced, when viewed in the figures, from left to right during operation through the interior of the drum screen 3.

At the upstream end of the drum screen 3 there is attached to the wall of the housing 2 a tube stub 19 which extends through the wall of the housing and which is provided with a flange 20 at its end situated outside the housing. Inserted through said flange is a tubular supply line 21 which is shown in greater detail in FIGS. 7–9, which supply line extends over part of the length of the drum screen 3 in the interior thereof. The supply line 21 is sealed at the end disposed in the drum screen, whereas there is attached to the other end a flange 22 which makes contact with the flange 20 of the tube stub 19. At the same time, the flange 22 is retained between flange 20 and a flange 24 attached to an end of a feed line 23.

The supply line 21 is provided, in the exemplary embodiment shown, with three rows of holes 21 which extend in the longitudinal direction of the supply line 21 and which, when viewed in the longitudinal direction of the respective rows, are arranged so as to be staggered with respect to one another. In this connection, the centremost row of holes is staggered at an angle of ±450° with respect to a horizontal plane through the centre line of the feed line 21, in such a way that, during operation, the gluten supplied in the direction of the drum screen wall 17 is thrown obliquely upwards into the interior of the drum screen.

Provided near the top of the drum screens 3 are spraying lines 26 which furthermore extend out of the drums parallel to the drums and which are provided with spraying nozzles disposed at a regular distance from one another. Via said spraying nozzles, rinsing fluid can be supplied onto and through the perforated drums into the interior of the drums to wash the gluten displaced through the drums by means of the helical transport elements and to rinse clean the perforations in the drum screen wall 17.

Figure 2:
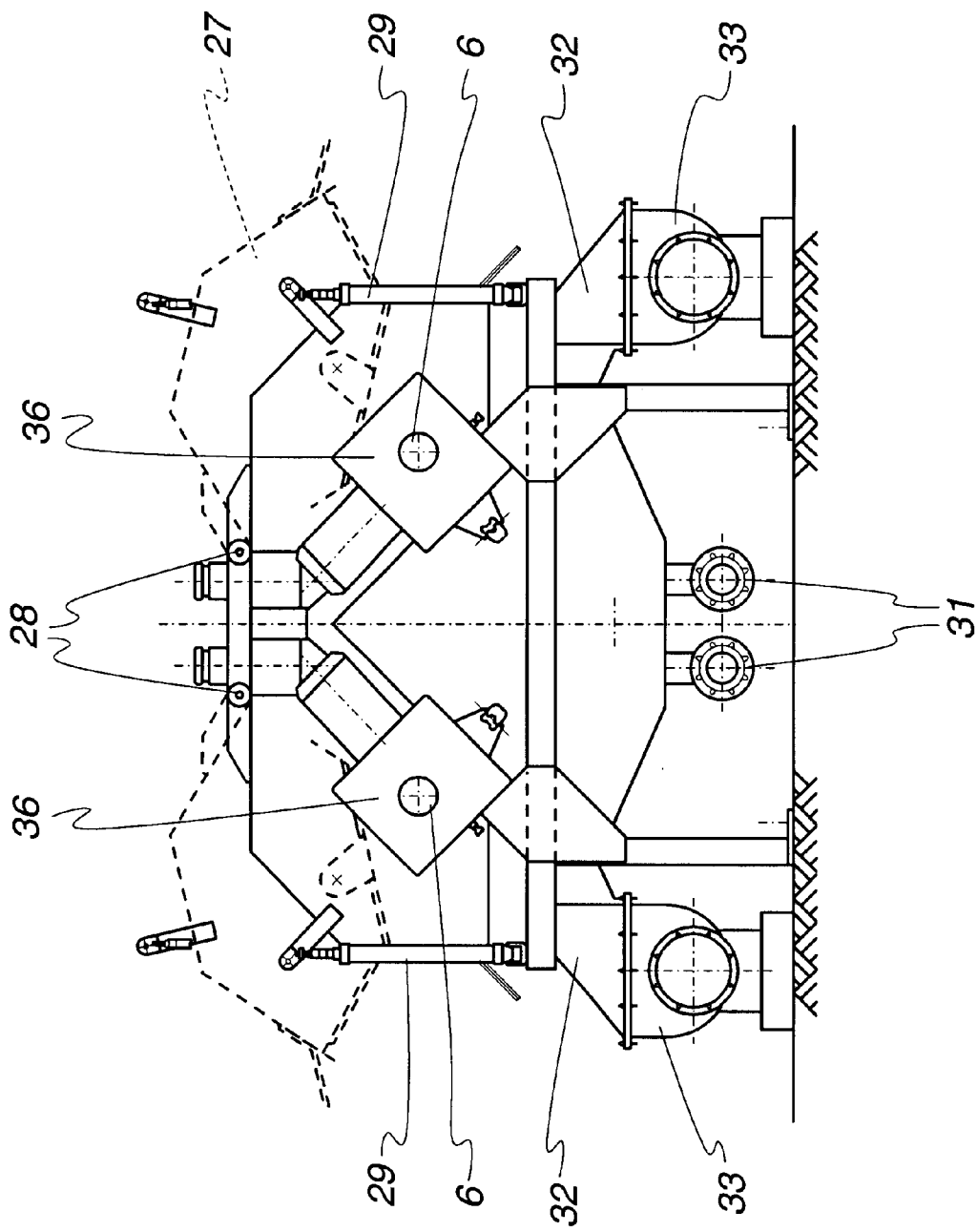
FIG. 2 shows diagrammatically a front view of the device according to the invention.
Figure 3:
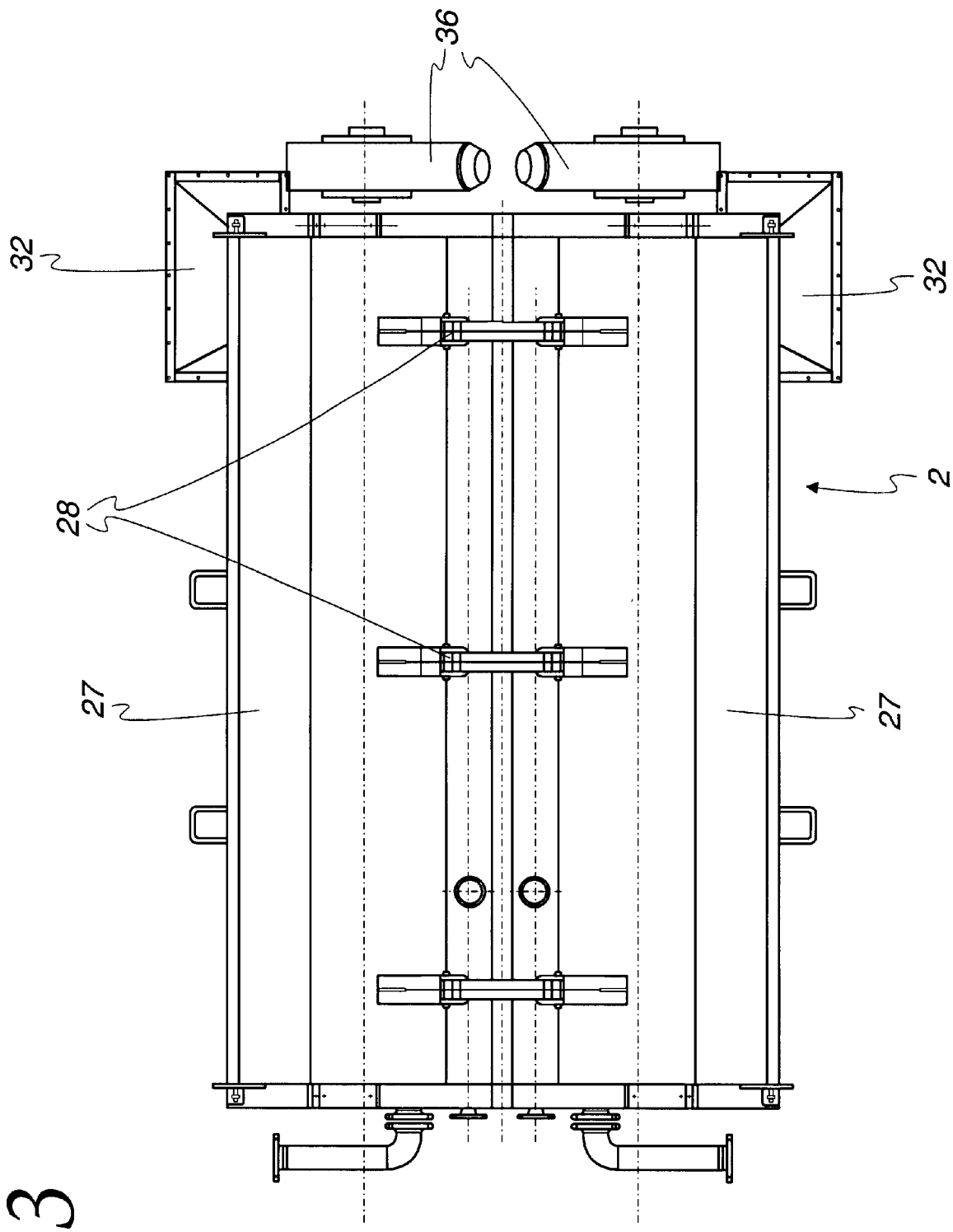
FIG. 3 shows diagrammatically a plan view of the device according to the invention.

Each drum 3 is covered near its top and near the outside of the device by a cap 27 forming part of the housing 2. Each cap can be swivelled about a hinge shaft 28 disposed near the longitudinal centre plane of the device with the aid of an operating cylinder 29 provided between the frame and the respective cap (FIG. 2). In this connection, each cap can be swivelled between the closed state shown in the figures and the open state shown by broken lines in FIG. 2. In the open state of the cap, the drum screen 3 is readily accessible for maintenance and cleaning operations and the like.

Figure 6:
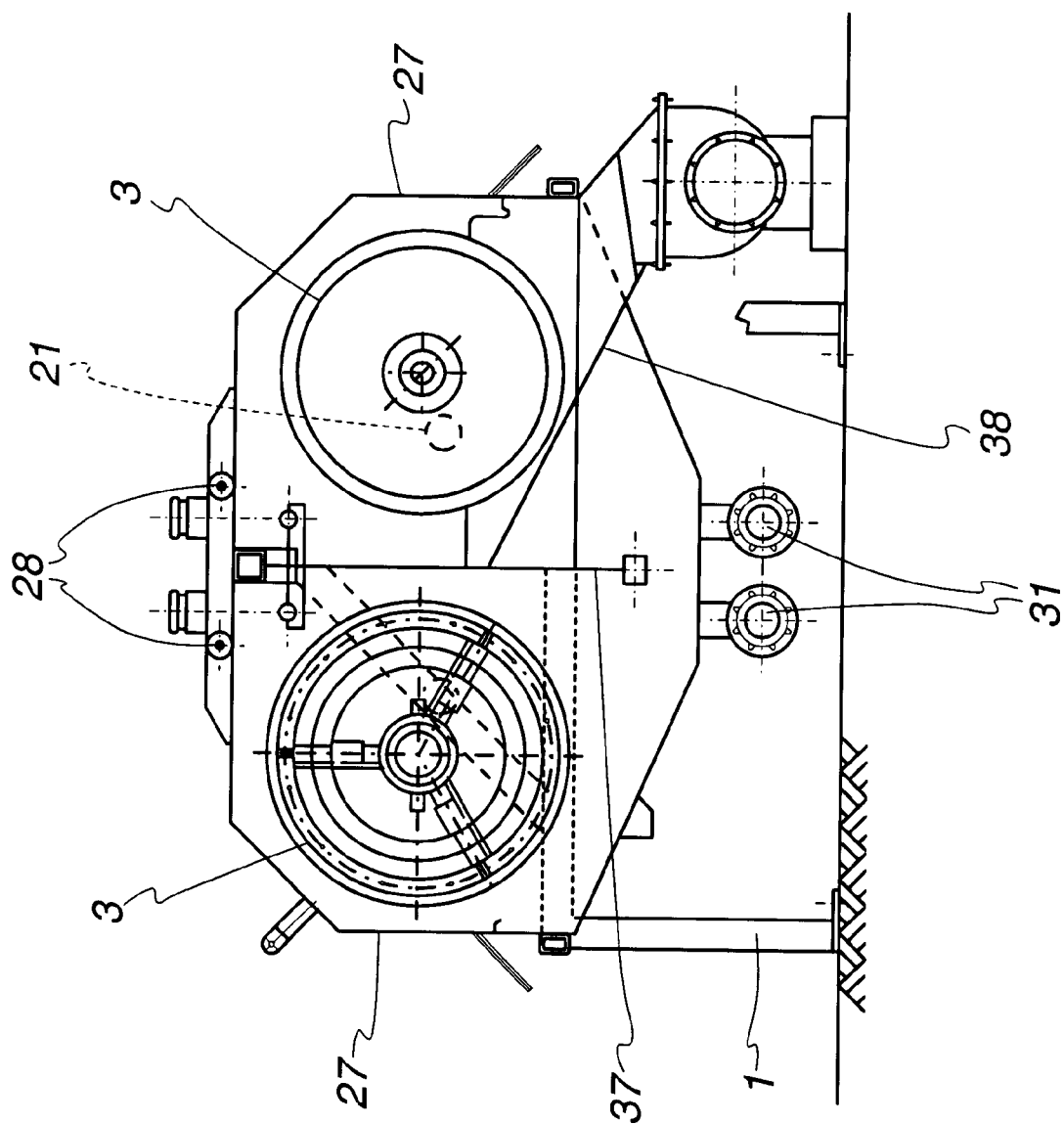
FIG. 6 shows an end of the device, partly in section and partly in view.
Figure 13:
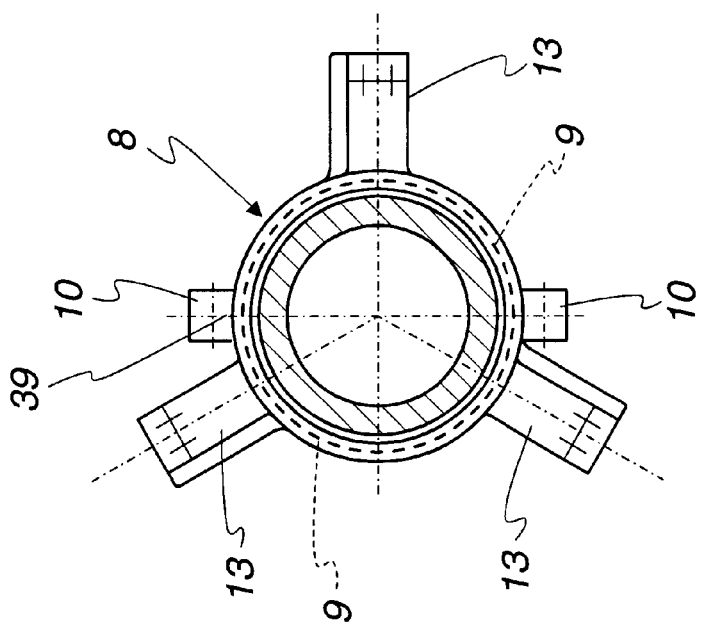
FIG. 13 shows a cross section of the hollow shaft of FIG. 12 at the position of the spoke-type elements supporting the circumferential wall of the drum screen.
Figure 12:
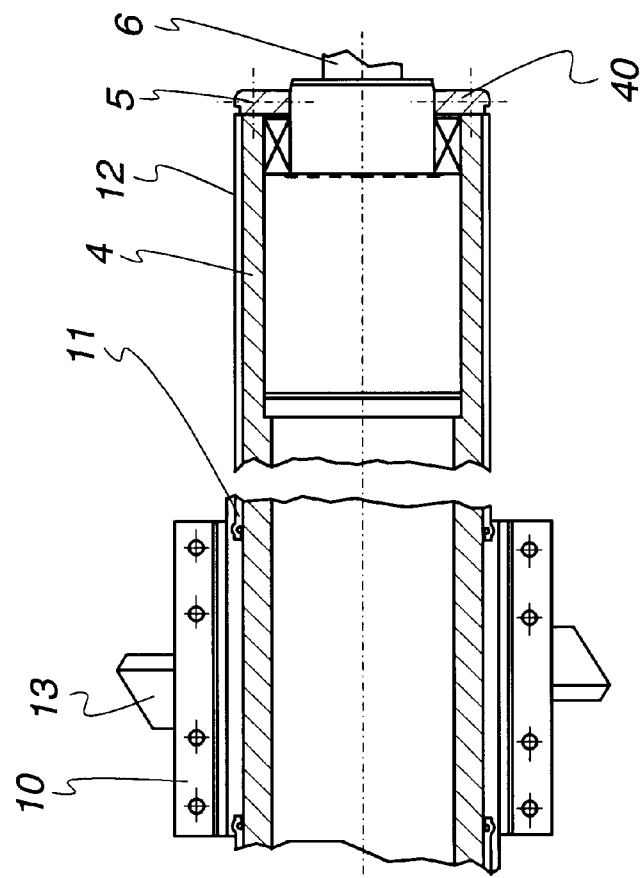
FIG. 12 shows, on an enlarged scale, a part of the hollow shaft, shown in FIG. 10, of the drum screen with a shaft stub provided in an end thereof.

The lower side of the housing forms a kind of trough 30 to which, when viewed in the longitudinal direction of the housing, two discharge lines 31 disposed next to one another (FIG. 6) are attached.

Furthermore, at the end of the housing 2 remote from the supply line 21 there are provided on the sides of the housing discharge ducts 32 which extend downwards and which connect to a pump housing 33. Each pump 33 can be driven with the aid of a motor 34 connected to one side of the pump, while a discharge line 35 is connected to the other side of the pump.

A shaft journal 6 extending outside the housing from each drum screen 3 is connected directly to a drive unit 36 which is attached to the outside of the housing and with the aid of which the drum screen is rotated during operation.

The operation of the device is as follows.

The gluten to be treated is supplied via the lines 23 and 21 to the drum screen and sprayed outwards from the holes 25 provided in the lines 21 against the inner circumference of the wall 17 of the two drum screens 3, which rotate during operation. Gluten introduced into a drum screen 3 will be displaced, when viewed in the figures, from the left-hand end of the drum screen 3 to its right-hand end with the aid of the transport helix extending along the inner circumference of the drum screen. In this process, depending on the operating conditions, rinsing water can be sprayed continuously or intermittently against the outer circumference of the drum screen wall via the spray lines 26 for washing the gluten and also for rinsing the perforations in the wall 17 clean. During the washing of the gluten, the starch still contained in it will be rinsed out of it and end up in the trough 30 with the rinsing water via the perforations in the drum screen wall in order to be removed therefrom for further processing. In this connection, the trough 30 may be separated into two parts by a vertical partition 37 which extends in the longitudinal direction of the device, so that rinsing water originating from the drum screen 3 can be removed separately from rinsing water originating from the other drum screen.

Figure 5:
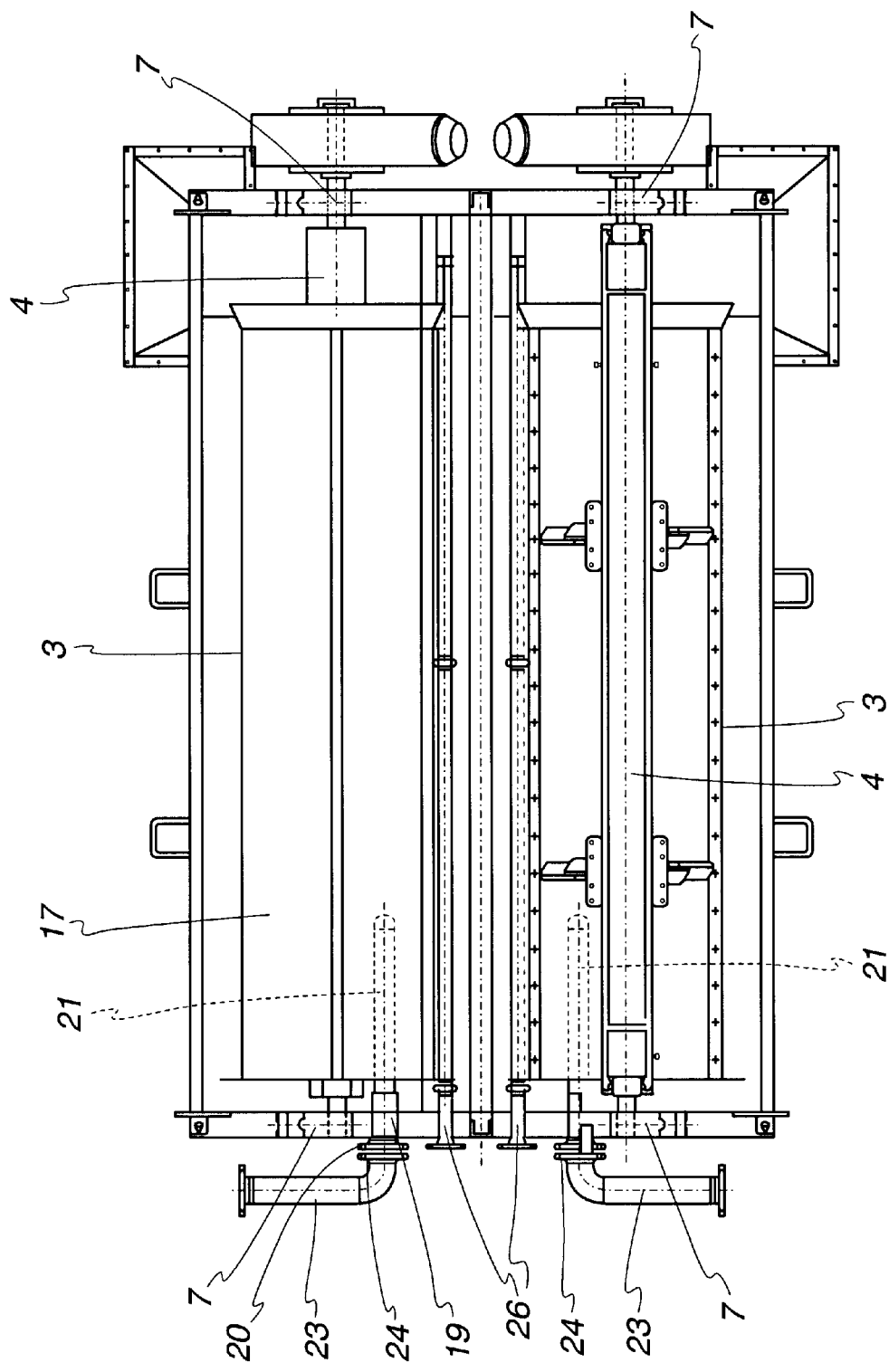
FIG. 5 shows the device as seen from above, partly in section and partly in view.

The washed gluten falls out of the open right-hand end, when viewed in FIGS. 4 and 5, of the sieving drum 3 onto guide plates 38 which are provided underneath the respective drums in the housing 2 and over which the gluten slides in the direction of the discharge ducts 32 and the pumps 33 in order to be discharged via lines 35 with the aid of the pumps 33.

During transportation through the drum screen 3, the gluten is always moved upwards by the transport helix 18 along the drum screen wall 17, the gluten dropping down on reaching a point disposed near the top of the drum screen and falling again onto the drum screen wall with an impact. This process takes place continuously and, during it, continuously varying loads occur on the shaft 4.

In the case of the gluten washing device according to the invention, said continuously varying loads have no disadvantageous consequences as in the known gluten washing device in which the shaft made of stainless steel ruptures after a relatively short time has elapsed.

By making use of a bush to be clamped around the shaft, to which bush the spoke-type elements supporting the circumferential wall of the drum screen are attached, no machining or welding operations have to be carried out on the shaft, which operations may form preferential rupture regions. The provision of a corrosion-resistant lining sleeve around the shaft has, in addition, the result that a material which does not have to be corrosion-resistant can be chosen for a shaft having a high resistance to continuously varying loads, as a result of which steel tubes of the desired length, diameter and wall thickness can be used which are generally available commercially and are cheap compared with stainless-steel shafts.

From the above it will be clear that a gluten washing device is provided which has a high capacity and requires little maintenance, which is of great advantage for continuous operation, while the necessary maintenance can be carried out easily and quickly, and that the modern requirements relating to working conditions and environment are met by providing a housing completely enclosing the drums screens of the device.

What is claimed is:

1. An apparatus for treating gluten comprising at least one drum screen holding said gluten during the treating process and being adapted to allow wash water used to treat said gluten to drain therethrough, said drum screen comprising a circumferential wall and having first and second ends;

a corrosion-resistant drum shaft for rotatably supporting said drum screen;

a drive unit which rotatably drives said corrosion-resistant drum shaft;

a water supply system providing wash water to said drum screen to wash said gluten;

a water disposal system for removing spent wash water from said drum screen;

a gluten transport system for supplying unwashed gluten to the first end of said drum screen and removing washed gluten from the second end of said drum screen;

at least one spoke element supporting the circumferential wall of the drum screens said spoke element being made of a corrosion-resistant material;

at least one bush for mounting said spoke element, said bush being made of at least two parts of corrosion-resistant material and being clamped on said drum shaft; and wherein the gluten transport system includes a supply line which extends in an interior of said drum screen over a part of the length of the drum screen and is provided with a number of discharge openings disposed in the longitudinal direction of the supply line at a distance to one another.

2. An apparatus according to claim 1 wherein the supply line can be removed from an outside of said drum screen.

3. An apparatus according to claim 1 wherein the supply line is provided with discharge openings over a part of its circumference disposed so that the gluten flowing out of the discharge openings is sprayed upwards in the direction of an inner circumference of the drum screen wall.

4. An apparatus for treating gluten comprising:

housing for enclosing a plurality of drum screens;

a plurality of drum screens arranged substantially parallel to one another, said drum screens being adapted to hold said gluten during the treating process and being adapted to allow wash water used to treat said gluten to drain therethrough, said drums screens comprising a circumferential wall and having first and second ends provided with end rims;

a plurality of corrosion-resistant drum shafts for rotatably supporting said drum screens, said drum shafts being made of a steel having a high modulus of elasticity;

a plurality of drive units which rotatably drives said corrosion-resistant drum shafts;

a water supply system providing wash water to said drum screens to wash the gluten;

a water disposal system for removing spent wash water from said plurality of drum screens;

a gluten transport system for supplying unwashed gluten to a first end of said drum screens and removing washed gluten from a second end of said drum screens, said unwashed gluten being supplied through a plurality of supply lines extending over part of a length of the drum screens in the interior thereof and having a number of discharge openings disposed in the longitudinal directions of the supply line at a distance from one another;

at least one spoke element supporting the circumferential wall of the drum screens, said spoke elements being made of a corrosion-resistant material; and, at least one bush for mounting said spoke element, said bush being made of at least two parts of corrosion-resistant material and being clamped on said drum shafts;

a plurality of lining sleeves made or a corrosion-resistant material and disposed around said drum shafts between the end rims provided of said drum shafts, said lining sleeves adjoining said bush and end rims and sealing said drum shafts in a leak proof manner.

5. An apparatus according to claim 4 wherein the supply line extends through a tube stub which is attached to said housing and which is provided at its end projecting outside of the housing with a supply line flange, said supply line flange having a first side in contact with the end of the supply line and second side remote from the tube stub, and in which a flange feed line is provided which contacts the second side of the supply line flange.

* * * * *